United States Patent [19]

Erskine et al.

[11] Patent Number: 5,243,858
[45] Date of Patent: Sep. 14, 1993

[54] FLUID FLOW SENSOR WITH THERMISTOR DETECTOR

[75] Inventors: James C. Erskine, Birmingham; David K. Lambert, Sterling Heights; Charles R. Harrington, Troy, all of Mich.

[73] Assignee: General Motors Corporation, Detroit, Mich.

[21] Appl. No.: 743,961

[22] Filed: Aug. 12, 1991

[51] Int. Cl.$^5$ .............................................. G01F 1/68
[52] U.S. Cl. .............................. 73/204.26; 73/861.95
[58] Field of Search ........... 73/204.23, 204.25, 204.26, 73/861.95

[56] References Cited

U.S. PATENT DOCUMENTS

| 2,799,165 | 7/1957 | Varvel | 73/861.95 |
| 3,922,912 | 12/1975 | Bradbury | 73/861.95 |
| 4,483,200 | 11/1984 | Togawa | 73/861.95 |
| 4,576,050 | 3/1986 | Lambert | 73/861.95 |
| 4,651,564 | 3/1987 | Johnson et al. | 73/204.26 |
| 4,682,496 | 7/1987 | Miura et al. | 73/204.23 |
| 4,713,970 | 12/1987 | Lambert | 73/861.95 |
| 4,884,443 | 12/1989 | Lee et al. | 37/204.26 |

FOREIGN PATENT DOCUMENTS 2934565  3/1981  Fed. Rep. of Germany ... 73/861.95

OTHER PUBLICATIONS

D. K. Lambert, "Mass Flow Sensing With Heat Waves: The Effect of Gas Pressure" (submitted to International Journal of Heat and Mass Transfer), (May 27, 1992).
D. K. Lambert and C. R. Harrington, "An Air Flow Sensor Based On Interface Thermal Wave Propagation", *J. Appl. Phys.* 59, No. 1, pp. 59-65 (Jan. 1, 1986).
A. F. P. Van Putten and S. Middelhoek, "Integrated Silicon Anemometer", *Elecronics Letters*, 10, No. 21, pp. 425-426 (Oct. 17, 1974).
J. H. Huijsing, J. P. Schuddemat and W. Verhoef, "Monolithic Integrated Direction-Sensitive Flow Sensor", *IEEE Transactions On Electron Devices*, ED-29, No. 1, pp. 133-136 (Jan. 1, 1982).
A. F. P. Van Putten, "An Integrated Silicon Double Anemometer", *Sensors and Actuators*, 4, pp. 387-396 (1983).
Y. C. Tai, R. S. Muller and R. T. Howe, "Polysilicon--Bridges For Anemometer Applications", *Transducers'85*, (1985 International Conference on Solid-State Sensors and Actuators), IEEE (New York), pp. 354-357 (1985).
O. Tabata, "Fast-Response Silicon Flow Sensor With An On-Chip Fluid Temperature Sensing Element", *IEEE Transactions On Electron Devices*, ED-33, No. 3, pp. 361-365 (Mar. 1986).
G. N. Stemme, "A Monolithic Gas Flow Sensor With Polyimide As Thermal Insulator", *IEEE Transactions On Electron Devices*, ED-33, No. 10, pp. 1470-1474 (Oct. 1986).
R. G. Johnson and R. E. Higashi, "A Highly Sensitive Silicon Chip Microtransducer For Air Flow and Differential Pressure Sensing Applications", *Sensors and Actuators* 11, pp. 63-72 (1987).
N. Tanaka, A. Jinda, J. Tanaka, Y. Inami and M. Hijikigawa, "Micro-Chip Flow Sensors For Measurement Of Flow Velocity And Direction", *Transducers '87*, (The 4th International Conference On Solid-State Sensors and Actuators), pp. 352-355 (1987).

(List continued on next page.)

Primary Examiner—Herbert Goldstein
Attorney, Agent, or Firm—Robert J. Wallace

[57] ABSTRACT

An airflow sensor formed on a silicon chip comprises a silicon base covered with an insulating polyimide layer, a lineal resistance heater on the chip energized with current pulses to propagate thermal waves, and a thermistor on the chip downstream of the heater to detect the arrival of each thermal wave. Circuitry determines flow rate as a function of the measured propagation time of the thermal wave. The thermistor may be replaced by a bridge of four resistive elements of which only one or two are sensitive to the thermal wave. The thermistor material is platinum, polycrystalline silicon or amorphous silicon which exhibit high temperature coefficients of resistance.

4 Claims, 2 Drawing Sheets

OTHER PUBLICATIONS

B. W. Van Oudheusden and J. H. Huijsing, "Integrated Silicon Flow-Direction Sensor", *Sensors and Actuators* 16, pp. 109–119 (1989).

B. W. Van Oudheusden, "The Behaviour Of A Thermal-Gradient Sensor In Laminar And Turbulent Shear Flow," *J. Phys. E: Sci. Instrum.* 22, pp. 490–498 (1989).

B. W. Van Oudheusden, "Silicon Thermal Flow Sensor With A Two-Dimensional Direction Sensitivity", *Meas. Sci. Technol.* 1, pp. 565–575 (1990).

C. H. Stephan and M. Zanini, "A Micromachined, Silicon Mass-Air-Flow Sensor For Automotive Applications", *Transducers '91*, (1991 International Conference On Solid-State Sensors And Actuators, IEEE, Piscataway, N.J.) pp. 30–33 (1991).

J. Kielbasa, J. Rysz, A. Z. Smolarski and B. Stasicki, "The Oscillatory Anemometer", *Fluid Dynamic Measurements In The Industrial And Medical Environments: Proceedings Of the Disa Conference* (edited by D. J. Cockrell, Leicester Univ. Press, Old Woking, Surrey, England), pp. 65–68 (1972).

J. Kielbasa, J. Piwowarczyk, J. Rysz, A. Z. Smolarski and B. Stasicki, "Heat Waves In Flow Metrology", *Flow Measurement of Fluids* (edited by H. H. Dijstelbergen and E. A. Spencer, North-Holland, Amsterdam), pp. 403–407 (1978).

J. Kielbasa, "Determination Of The Flow Velocity Vector By Using The Method Of Heat Waves", *Bulletin De L'Academie Polonaise Des Sciences*, 26, No. 4, pp. 283–289 (1978).

L. S. G. Kovásznay, "Hot-Wire Investigation Of The Wake Behind Cylinders At Low Reynolds Numbers", *Proc. Roy. Soc. London A*, 198, pp. 174–190 (1949).

R. E. Walker and A. A. Westenberg, "Absolute Low Speed Anemometer", *The Review of Scientific Instruments*, 27, No. 10, pp. 844–848 (Oct. 1956).

H. Rahnamai and J. N. Zemel, "Phyroelectric Anemometrs: Preparation And Flow Velocity Measurements", *Sensors and Actuators* 2, pp. 3–16 (1981/82).

J. R. Frederick, J. N. Zemel and N. Goldfine, "Pyroelectric Anemometers: Experimental Geometric Considerations", *J. Appl. Phys.* 57 (11), pp. 4936–4943 (Jun. 1, 1985).

P. Hesketh, B. Gebhart, and J. N. Zemel, "Heat Transfer Model For The Pyroelectric Anemometer", *J. Appl. Phys.* 57 (11), pp. 4944–4949 (Jun. 1, 1985).

P. I. Geshev, "Heat-Wave Method For Studying The Structure Of A Viscous Boundary Layer", *Teplofizika Vysokikh Temperatur (USSR)*, 25, No. 1, pp. 130–134 (Jan.-Feb. 1987) [High Temp. (USSR) 25, 117–121 (1987)].

C. Yang, M. Kümmel and Seeberg, "A Transit-Time Flow Meter For Measuring Milliliter Per Minute Liquid Flow", *Rev. Sci. Instrum.* 59 (2), pp. 314–317 (Feb. 1988).

H. Y. Hsieh, A. Spetz and J. N. Zemel, "Wide Range Pyroelectric Anemometers For Gas Flow Measurements", *Transducers '91* (1991 International Conference On Solid-State Sensors and Actuators, IEEE, Piscataway, N.J.), pp. 38–40 (1990).

A. A. Townsend, "The Diffusion Of Heat Spots In Isotropic Turbulence", *Proc. Roy. Soc. Lond. A*, 209, pp. 418–430 (1951).

A. B. Bauer, "Direct Measurement Of Velocity By Hot-Wire Anemometry", *AIAA Journal* 3, No. 6, pp. 1189–1191 (1965).

L. J. S. Bradbury and I. P. Castro, "A Pulsed-Wire Technique For Velocity Measurements In Highly Turbulent Flows", *J. Fluid Mech.* 49, Part 4, pp. 657–691 (1971).

I. H. Tombach, "An Evaluation Of The Heat Pulse Anemometer For Velocity Measurement In Inhomogeneous Turbulent Flow", *Review of Scientific Instruments*, 44, No. 2, pp. 141–148 (Feb. 1973).

J. K. Eaton, R. V. Westphal and J. P. Johnston, "Two New Instruments For Flow Direction And Skin-Friction Measurements In Separated Flows", *ISA Transactions*, 21, No. 1, pp. 69–78 (1982).

I. P. Castro and M. Dianat, "The Pulsed Wire Skin-Friction Measurement Technique", *Fifth Symposium On Turbulent Shear Flows* (edited by J. L. Lumley, B. E. Launder, W. C. Reynolds and J. H. Whitelaw, Cornell University, Ithaca, N.Y.), pp. 11.19–11.24 (Aug. 1985).

H. Sontag and A. C. Tam, "Time-Resolved Flow-Velocity And Concentration Measurements Using A Traveling Thermal Lens", *Optics Letters*, 10, No. 9, pp. 436–438 (Sep. 1985).

J. A. Sell, "Photothermal Investigations Of Solids And Fluids", edited by J. A. Sell, Academic Press, San Diego, pp. 213–248 (1989).

(List continued on next page.)

OTHER PUBLICATIONS

P. M. Handford and P. Bradshaw, "The Pulsed-Wire Anemometer", *Experiments In Fluids*, 7, pp. 125–132 (1989).

W. J. Devenport, G. P. Evans and E. P. Sutton, "A Traversing Pulsed-Wire Probe For Velocity Measurements Near A Wall", *Experiments In Fluids*, 8, pp. 336–342 (1990).

I. P. Castro and M. Dianat, "Pulsed Wire Velocity Anemometry Near Walls", *Experiments In Fluids*, 8, pp. 343–352 (1990).

G. Taylor, "Dispersion Of Soluble Matter In Solvent Flowing Slowly Through A Tube", *Proc. Roy. Soc. Lond. A* 219, pp. 186–203 (1953).

R. Aris, "On The Dispersion Of A Solute In A fluid Flowing Through A Tube", *Proc. Roy. Soc. Lond. A*, 235, pp. 67–77 (1956).

W. N. Gill and R. Sankarasubramanian, "Dispersion Of A Non-Uniform Slug In Time-Dependent Flow", *Proc. Roy. Soc. Lond A.* 322, pp. 101–117 (1971).

R. Smith, "Shear Dispersion Looked At From A New Angle", *J. Fluid Mech.*, 182, pp. 447–466 (1987).

I. Frankel and H. Brenner, "On The Foundations Of Generalized Taylor Dispersion Theory", *J. Fluid Mech.*, 204, pp. 97–119 (1989).

J. L. Neuringer, "Green's Function For An Instantaneous Line Particle Source Diffusing In A Gravitational Field And Under The Influence Of A Linear Shear Wind", *SIAM J. Appl. Math*, 16, No. 4, pp. 834–842 (Jul. 1968).

G. F. Carrier, "Useful Approximations In Wiener-Hopf Problems", *Journal Of Applied Physics*, 30, No. 11, pp. 1769–1774 (Nov. 1959).

H. K. Kuiken, "On The Influence Of Longitudinal Diffusion In Time-Dependent Convective-Diffusive Systems", *J. Fluid Mech.*, 165, pp. 147–162 (1986).

H. Schlichting, "Boundary-Layer Theory", 6th Edition, McGraw-Hill, N.Y., pp. 258–263 (1968).

R. F. Blackwelder, "Hot-Wire And Hot-Film Anemometers", *Fluid Dynamics*, Part A, (edited by R. J. Emrich, Academic Press, N.Y.), 18, Section 1.2.4, pp. 259–314 (1981).

D. C. Collis and M. J. Williams, "Two-Dimensional Convection From Heated Wires At Low Reynolds Numbers", *J. Fluid Mech.* 6, pp. 357–384 (1959).

Y. S. Touloukian, P. E. Liley and S. C. Saxena "Thermal Conductivity, Nonmetallic Liquids and Gases", *Thermophysical Properties Of Matter*, IFI/Plenum, N.Y.-Wash., 3, p. 512 (1970).

D. R. Lide, *CRC Handbook Of Chemistry And Physics*, 71st Edition, CRC Press, Boca Raton, Fla., p. 6-1 (1991).

Y. S. Touloukian, R. W. Powell, C. Y. Ho and P. G. Klemens, "Thermal Conductivity, Metallic Elements and Alloys", *Thermophysical Properties Of Matter*, IFI/Plenum, N.Y.-Wash., 1, p. 339 (1970).

Y. S. Touloukian, R. W. Powell, C. Y. Ho and M. C. Nicolaou, "Thermal Diffusivity", *Thermophysical Properties Of Matter*, IFI/Plenum, N.Y.-Wash., 10, p. 160 (1973).

D. K. Lambert, "Polyimide Film On Silicon: Use Of IR Emission Modulation To Obtain Thermal Conductivity", *Thermal Conductivity 21*, (edited by C. J. Cremers and H. A. Fine, Plenum Press, N.Y.), pp. 209–221 (1990).

M. Soliman and P. L. Chambré, "On The Time-Dependent Lévêeque Problem", *Int. J. Heat Mass Transfer*, 10, pp. 169–180 (1967).

L. Howarth, "On The Solution Of The Laminar Boundary Layer Equations", *Proc Roy Soc. Lond. A*, 164, pp. 547–579 (1938).

Y. S. Touloukian, S. C. Saxena and P. Hestermans, "Viscosity", *Thermophysical Properties Of Matter*, IFI/Plenum, N.Y.-Wash., 11, p. 611 (1975).

FLUID FLOW SENSOR WITH THERMISTOR DETECTOR

FIELD OF THE INVENTION

This invention relates to fluid flow sensors and particularly to such sensors having thermistors for detecting thermal waves propagated through the fluid.

BACKGROUND OF THE INVENTION

Prior patents relating to this invention are U.S. Pat. No. 4,576,050 to Lambert entitled, "Thermal Diffusion Fluid Flow Sensor," and U.S. Pat. No. 4,782,708 to Harrington and Heremans entitled, "Thermocouple Sensors," both of which are incorporated herein by reference.

The Lambert patent is directed to a sensor having a silicon chip covered by a polyimide film which supports a heating resistor for emitting thermal waves and a thermocouple for sensing the thermal waves. When the sensor is immersed in flowing fluid such as air, the thermal waves are propagated from the heating resistor to the thermocouple through the fluid at a rate which is dependent on the flow rate of the fluid. A circuit is provided to supply oscillating current to the heating resistor to emit the thermal waves and to detect the time of arrival of the thermal waves at the thermocouple and determine flow rate on the basis of propagation time. The thermocouple system was proposed to be Pb/PbTe. The Pb/PbTe thermocouple has an output of about 0.5 mv/K but has an unstable resistance.

The Harrington and Heremans patent discloses a thermocouple system comprising BiSb forming junctions with gold, platinum or nickel for use in the Lambert flow sensor. The Pt/BiSb thermocouple has an output of 0.140 mv/K and has a stable resistance, although it is subject to corrosion. With either thermocouple, the signal developed by the thermocouple detector is quite small and requires an expensive high gain, low noise amplifier to couple the detector signal to the timing circuit which determines the propagation time.

SUMMARY OF THE INVENTION

It is therefore an object of the invention to provide a fluid flow sensor with a stable high signal output thermal detector. Another object is to provide a thermal wave detector for a fluid flow sensor which requires no high gain, low noise amplifier.

The invention is carried out by a fluid flow sensor comprising: a substrate for immersion in a fluid; a resistive strip heater supported on said substrate and adapted to be supplied with periodic heating power for propagating thermal waves through the fluid; and means for sensing thermal waves propagated from the strip heater comprising thermistor means supported on said substrate on at least one side of the heater.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a sensor developed specifically for measurement of airflow; however, it should be recognized that it applies to the measurement of flow in other fluids as well. The principles set forth in U.S. Pat. No. 4,576,050, discussed above, apply to this invention. It has been found that certain advantages accrue from the use of thermistors instead of thermocouples for thermal wave detectors.

Figure 1:
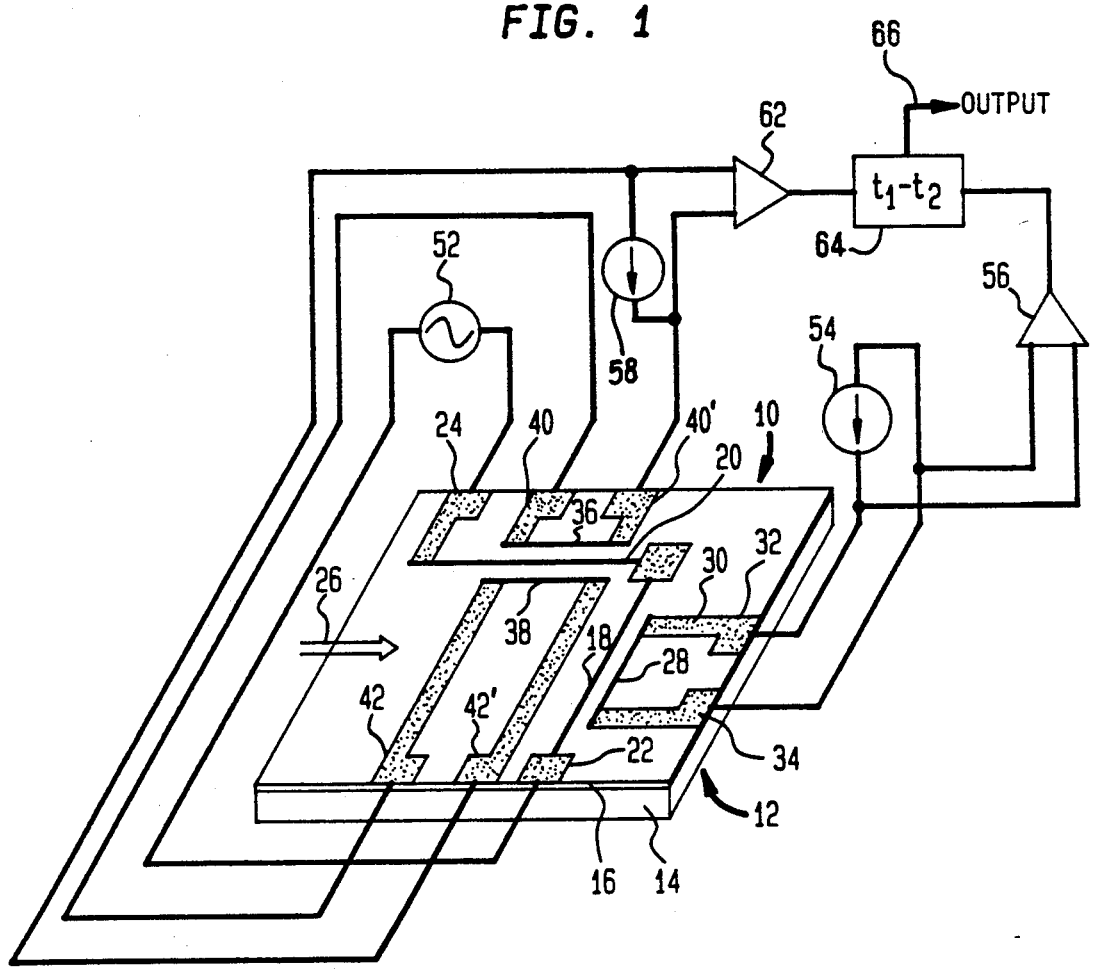
FIG. 1 is an isometric view of a fluid flow sensor and schematic circuitry according to the invention.

Referring to FIG. 1, an airflow sensor 10 has a substrate 12 including a silicon chip 14 covered with a layer 16 of polyimide. A pair of resistive heater strips 18 and 20 are disposed normal to one another and electrically connected in series between terminal pads 22 and 24 at the edges of the substrate 12. The terminal pads, heater strips and any intervening conductors are formed of thin film platinum, for example. The airflow direction depicted by the arrow 26 is parallel to heater strip 20 and normal to heater strip 18. A thermistor 28 comprising a thin film lineal resistor is located parallel to and very close to the heater strip 18 at the downstream side thereof for exposure to thermal waves emanating from the heater. A spacing of 50 microns between the heater strip 18 and the thermistor 28 is suitable. The thermistor 28 is connected at each end by conductor paths 30 to terminal pads 32 and 34. The heater strip 20 is bounded on each side by parallel lineal thermistors 36 and 38 also spaced by 50 microns from the heater strip. The thermistors 36 and 38 are connected to terminal pads 40, 40', 42 and 42', respectively. If desired, another thermistor (not shown) parallel to the heater strip 18 and upstream thereof may be used; this is desirable especially where flow reversals may occur. However, in our preferred embodiment, the geometrical symmetry inherent to the above description between the active areas of the reference and the downstream sensor(s) should be preserved. It provides an inherent manufacturing and performance advantage. By performance advantage we mean that there is an inherent compensation for variations in environmental conditions.

We prefer to have electrical symmetry in addition to the geometrical symmetry. For example, if a single battery were to be used to supply the current to all thermistors, then a voltage divider could be used so as to supply identical currents to each thermistor circuit. In addition, for the battery to act as a current source, one would want to have a series resistor for each of the reference and sensing sides of the circuitry. The resistor in series with the reference thermistors should have the same resistance as both of the reference thermistors with the heater powered and current flowing in the reference side of the circuit. The resistor in series with the sensing thermistor should have the same resistance as the sensing thermistor with the heater powered and current flowing in the sensing side of the circuit.

The circuitry external to the chip includes an oscillating current source 52 coupled to the terminal pads 22 and 24 to produce thermal waves in each of the heaters 18 and 20. A constant current source 54 connected in series with the terminal pads 32 and 34 biases the thermistor 28 to a nominal voltage, and a differential amplifier 56 across the terminal pads 32 and 34 senses AC voltage developed on the thermistor in response to thermal waves. The output of the differential amplifier circuit 56 is an amplified ac difference between the terminal pads. Differential amplifier circuits 62, 80 and 86 are similar. Similarly, constant current source 58 is connected to pads 40, 40', 42 and 42' to bias the thermistors 36 and 38. The thermistors 36 and 38 are connected across the inputs of a differential amplifier 62 which senses the combined time of thermal wave detection. A timing circuit 64 coupled to the outputs of both differential amplifiers 56, 62 measures the ac time difference between the detected thermal waves as output 66.

In operation, the airflow affects the propagation of thermal waves from the heater 18 to the thermistor 28. A greater airflow results in less propagation time. The difference in propagation time between a still air condition and a measured condition is a measure of the airflow. The still air propagation time is measured by the thermistors 36 and 38. When the airflow direction is parallel to the heater 20 the propagation times to the thermistors 36 and 38 are equal and represent the still air propagation time. When the airflow varies by a small angle from the parallel direction, the combined thermistor signals still yield the still air propagation time. This measurement takes into account changing parameters such as air temperature and pressure to provide a zero reference. The difference in propagation times, i.e., output 66, detected at thermistor 28 and at thermistors 36, 38 is determined in the timing circuit 64. This difference in propagation times is a function of the mass airflow when this sensor is disposed in an airflow duct and properly calibrated. The mounting and calibration of a mass airflow sensor is described in a related earlier filed U.S. Pat. application Ser. No. 07/637,724, which was filed 07 Jan. 1991 and is entitled, "Low Noise Fluid Flow Sensor Mounting." The relevant mounting and calibrating disclosure in U.S. Ser. No. 07/637,724 is hereby incorporated herein by reference.

The material of the thermistors 28, 36 and 38 in one embodiment of the invention is platinum. In that case the entire circuitry on the substrate, including heaters, connecting conductors and terminal pads, is preferably made of platinum and formed in the same step using thin film techniques, thus affording manufacturing advantages. The platinum metallization pattern is, for example, 0.18 $\mu$m thick, the heater strip is 1 mm long and 50 $\mu$m wide, while the thermistor 28 is 0.9 mm long and 10 $\mu$m wide. The temperature coefficient of resistance (TCR) is dependent on the thickness of the strip. For a thin film platinum thermistor of the type considered herein, the TCR is of the order of 0.0025/K at 393K and the resistivity is $(16-25)*10^{-6}$ ohm-cm. In a circuit that biases the thermistor at a constant current such that there are approximately 5 volts across the thermistor, a 1K change in temperature will change the voltage across the resistor by 12.5 mv. The TCR of the thermistor is 2550 ppm. Each heater strip has a resistance of 18 ohms and the thermistor has a resistance of 81 ohms when not energized. In practice, the heater is supplied with 54.7 mA rms, increasing the average heater resistance to 22.38 ohms, and each thermistor is biased by a current of 28 ma dc to increase its average resistance to 140 ohms. For a condition of no air flow, the thermistor temperature changes by about 0.1K in response to thermal waves yielding 1 mv peak-to-peak or 353 $\mu$v rms. For an equivalent 0.1K temperature change, this compares with 50 $\mu$v for the Pb/PbTe thermocouple cited above or 14 $\mu$v for the Pt/BiSb thermocouple. The resulting improvement in signal strength can relieve the requirement for expensive high gain, low noise amplifiers. Moreover, the 0.1K temperature change is a very conservative figure: it is believed that, in practice, temperature changes on the order of 0.25K can be obtained to yield even higher output voltages.

Thus, the signal levels that can be obtained from a biased metal film thermistor are larger than can be obtained with a thermocouple. The larger signal levels help in circumventing other problems such as ground loops and amplifier noise in providing a signal suitable for use by subsequent circuitry. Further, a platinum detector element is very stable in contrast to many thermocouple materials.

An additional advantage of using thermistors as in FIG. 1 over the use of thermocouples to detect the thermal waves is that heat flow in the thermistor is perpendicular to the current flow while heat flow in the thermocouple is parallel to the current flow. As a consequence, the thermocouple tends to reduce the detected temperature more than the thermistor does. That is, the thermistor avoids the thermal shunting effect of the thermocouple strip which reduces the effective thermal wave amplitude at the detector and hence the amplitude of the detector voltage signal.

Figure 2:
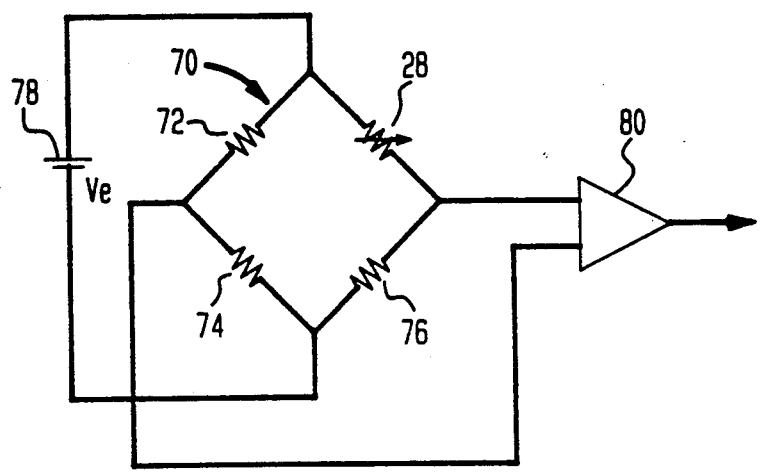
FIG. 2 is a schematic circuit of a detector arrangement according to a second embodiment of the invention.

By incorporating the thermistor in a bridge circuit, the common mode voltage in the signal can be eliminated at the differential amplifier. FIG. 2 shows a schematic circuit of a bridge arrangement 70 for a simple flow detector. A thermistor 28 is connected in a Wheatstone bridge configuration with resistors 72, 74 and 76. Thermistor 28 and the resistor 76 are connected across bridge inputs which are supplied by voltage source 78, and the resistors 72 and 74 are serially connected across the same inputs. The junction of resistors 72 and 74 form an output and the junction of thermistor 28 and resistor 76 form the other output. The outputs are coupled to a differential amplifier 80 which senses voltage differences at the outputs due to changes in thermistor temperature. Common mode voltage will be eliminated at the differential amplifier 80 and the bridge will be balanced when the values of thermistor 28 and resistor 72 are the same and the values of resistors 74 and 76 are the same. The resistors are conveniently formed on the same chip as the thermistor 28 but not close enough to the heater strip to be affected by the thermal waves. While all the resistors will vary in value with ambient temperature, only thermistor 28 senses the thermal wave from the heater, and the bridge output will reflect that event.

Figure 3:
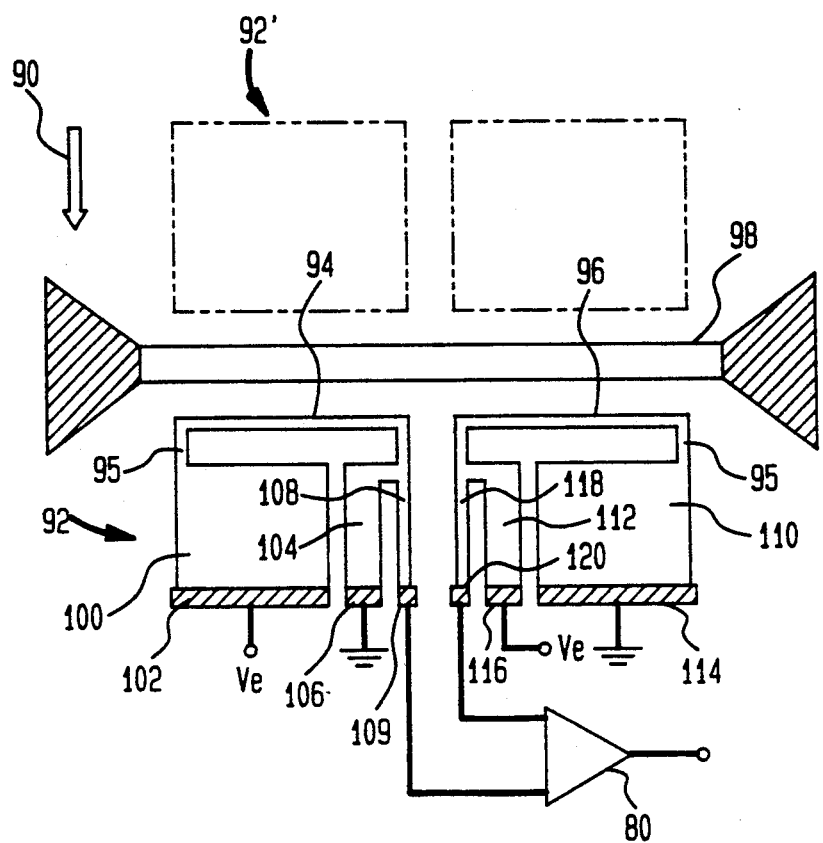
FIGS. 3 and 4 are a view of a thermistor detector configuration for a flow sensor and an equivalent schematic circuit, respectively, according to a third embodiment of the invention.
Figure 4:
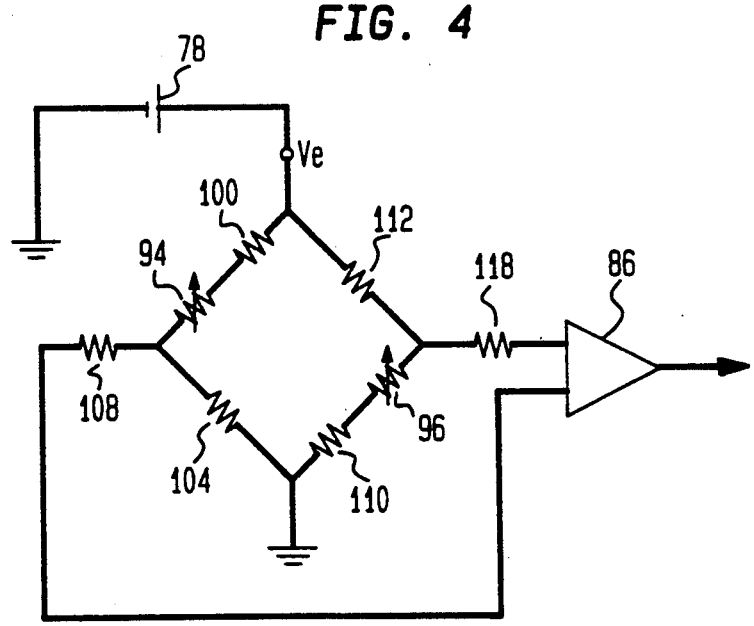

Still another Wheatstone bridge arrangement is shown in FIGS. 3 and 4. The substrate (not shown) for this bridge is a silicon chip with a polyimide layer like that described above. An arrow 90 shows the airflow direction. The bridge circuit 92 containing thermistors 94 and 96 is shown downstream of the heater strip 98. Two squares 92' shown in phantom lines represent an identical optional bridge circuit upstream of the heater strip. Thermistors 94 and 96, in opposite arms of the bridge, are adjacent to the heater strip 98 and responsive to the thermal waves. A conductive path shown as resistor 100 has a small resistance and connects an end of thermistor 94 to a terminal pad 102 which is coupled to a voltage source 78 ($V_e$). The other end of the thermistor 94 is connected by a resistor 104 to a grounded terminal pad 106 to form an adjacent arm of the bridge 92. Another conductive path shown as resistor 108 connects the junction of elements 94 and 108 to a pad 109 which is connected to the differential amplifier 80.

This completes the branch of the bridge containing the thermistor 94. The other branch containing thermistor 96 is similar and places the thermistor 96 in a bridge arm opposite the thermistor 94. Resistors 110 and 112 and pads 114 and 116 serially connect the thermistor 96 from the voltage source 78 to ground and resistive path 118 and pad 120 couple the output of that branch to the differential amplifier 80.

Typical dimensions for the bridge detector are as follows: The heater strip 98 is about 1 mm long and 50 μm wide. The thermistor strips 94 and 96 are parallel to the heater strip 98 and spaced therefrom by 50 μm. Each thermistor is 10 μm wide and 375 μm long. The runners 95 connecting each end of the thermistors to the adjoining elements is 25 μm wide. Resistors 108 and 118 carry very little current due to the high input impedance of the differential amplifier and thus have little effect on the bridge circuit. The resistors 100 and 110 which are conductive runners are made as wide as possible to minimize the resistance.

If all the arms of the bridge have the same nominal resistance R, the common mode voltage will be eliminated at the differential amplifier. If the change in resistance $R_c$ due to temperature change is the same for the thermistors 94 and 96 and resistors 100 and 110 are small enough to be ignored, it can be shown that $V_0 = V_3 [(R_c/R)/(2+R_cR)]$ where $V_0$ is the bridge output voltage, and $V_e$ is the bridge excitation voltage from source 78. For a temperature change of 1K, the quantity $R_c/R$ is the TCR of the thermistor material. It is thus evident that materials having higher values of TCR will yield higher bridge output voltages. For platinum with a TCR of 0.0025, a temperature change of 0.1K, and an excitation voltage of 5 volts, an output voltage $V_0$ of 0.624 mv peak-to-peak can be expected. If the resistors 100 and 110 are not small, the output will be less.

A thermistor material which is useful in the bridge and is a well-established semiconductor material is polycrystalline silicon. The TCR of this material is highly dependent on the doping. Low doping concentration yields high TCR but also produces a high resistivity which is difficult to control in bridge fabrication. The smallest practical doping (for a concentration of $3*10^{18}$) gives a TCR of 0.006. For an excitation voltage of 5 volts and a temperature change of 0.1K, the output voltage will be 1.5 mv peak-to-peak. A manufacturing limitation imposed by the polycrystalline silicon is that the deposition temperature is about 1000K which exceeds the limits of the polyimide layer. Thus, another insulator material would have to be used in place of the polyimide.

Another silicon thermistor material is hydrogenated amorphous silicon. This material is deposited at the relatively low temperature of 470K and is compatible with the polyimide insulator layer of the substrate. This material has a TCR on the order of 0.1 to 0.2. Assuming a TCR of 0.1, a temperature increase of 0.1K and an excitation voltage of 5 bolts, the bridge would have an output voltage of 23.8 mv peak-to-peak, thus producing a vastly higher output than the thermocouples used heretofore.

It will thus be seen that the embodiments of the invention set forth herein afford greatly improved fluid flow sensors by using thermistors in circuits having high voltage outputs compared to that available from thermocouples. The higher voltages make it possible to decrease the cost of signal processing circuits which extract propagation times to determine fluid flow. The improved sensors themselves may also be simpler to fabricate, particularly where the thermistors as well as the heater are made of the same material as the conductors, e.g., platinum. While platinum and other advantageous thermistor materials are described herein, the improved sensors can incorporate other thermistor materials as well. The chief limitation in thermistor material selection is the sensor fabrication process: in the preferred process, the material is deposited in thin film form and patterned photolithographically to create the desired thermal wave sensor patterns.

The embodiments of the invention in which an exclusive property or privilege is claimed are defined as follows:

1. A mass flow fluid sensor apparatus comprising: a mass flow sensor substrate for immersion in a moving fluid having a direction of flow, said mass flow sensor substrate having a thermal conductive body and a surface layer of a thermally and electrically insulating material;

a resistive strip heater supported on said substrate surface layer;

a first strip thermistor supported on said substrate surface layer for disposition upstream of said resistive strip heater, with respect to said direction of fluid flow;

a second strip thermistor supported on said substrate surface layer for disposition downstream of said resistive strip heater, with respect to said direction of fluid flow;

each of said heater, thermistors and all interconnecting circuitry being of the same material and thickness, and said thermistors mutually being of the game geometry and having a width and thickness that is small with respect to its length, effective to provide a geometric symmetry;

means for supplying periodic heating power to said strip heater, for propagating thermal waves upstream and downstream through the moving fluid;

means for applying a similar bias current at a similar voltage across each of said first and second thermistor, effective to provide an electrical symmetry;

signal processing means for detecting changes to voltage across said upstream and downstream thermistors, and for comparing such voltage changes in response to changes in the mass flow rate of said fluid, effective to determine mass flow rate of said fluid by determining the difference in arrival time or phase of said thermal waves from said strip heater at said upstream and downstream thermistors.

2. The mass flow sensor of claim 1 in which the upstream thermistor is oriented orthogonal to said heater strip and said downstream thermistor is parallel to said heater strip.

3. The mass flow sensor of claim 1 in which the heater and thermistor strips are of platinum, and are parallel to one another.

4. The mass air flow sensor of claim 3 in which the flow sensor substrate body is silicon, and the body surface layer is a polyimide film.

* * * * *